| United States Patent [19] | [11] Patent Number: 4,885,021 |
| Elrod | [45] Date of Patent: Dec. 5, 1989 |

[54] PARTICULATE UREA WITH CLAY INCORPORATED FOR HARDNESS AND/OR GELLING

[75] Inventor: Jimmie L. Elrod, Killen, Ala.

[73] Assignee: Tennessee Valley Authority, Muscle Shoals, Ala.

[21] Appl. No.: 158,810

[22] Filed: Feb. 22, 1988

[51] Int. Cl.$^4$ .............................................. C05C 9/00
[52] U.S. Cl. ...................................... 71/28; 71/64.12; 71/64.13; 264/5; 264/14
[58] Field of Search ...................... 71/28–30, 71/64.08, 64.12, 64.13; 264/5, 13, 14

[56] References Cited

U.S. PATENT DOCUMENTS 4,390,483  6/1983  Willems et al. ......................... 264/7

FOREIGN PATENT DOCUMENTS 138469  11/1979  Fed. Rep. of Germany .......... 71/28

Primary Examiner—Ferris H. Lander
Attorney, Agent, or Firm—Robert A. Petrusek

[57] ABSTRACT

Heretofore, two approaches have been utilized to improve storage stability, particularly a reduction in the tendency for caking during storage, of freshly prepared urea particles: (1) treat the surface of freshly prepared urea particles with conditioning agents, or (2) incorporate, within the urea particles, by means of addition to the urea melt, certain chemicals which act as hardening agents. This invention is directed to approach (2) supra, and by way of coincidence, to a third approach, to wit, utilizing a gelling clay as said additive to also act as an in situ suspending agent in instances wherein said treated urea is utilized in the subsequent production of suspension type fertilizers. The particular class of additives are clays of the group comprising channelized 2:1 clay minerals, namely attapulgite (palygorskite) and sepiolite and are added to the urea in relatively small quantities such that, although they impart the improved desired characteristics, they do not detract substantially from other properties thereof.

18 Claims, No Drawings

PARTICULATE UREA WITH CLAY INCORPORATED FOR HARDNESS AND/OR GELLING

INTRODUCTION

For many years numerous practitioners in the chemical fertilizer industry have been aware of the need for improvement in the physical characteristics, e.g., hardness and nonfriability, of prills and granulars of various fertilizers high in nitrogen values, such as for example, urea to prevent fracturing, dustiness, and caking thereof during storage and/or handling. As reported by the USDA for fiscal year 1980 [Annual Report, Economics, Statistics, and Cooperative Service, Crop Reporting Board, U.S. Department of Agriculture, Washington, D.C., (1980)], urea is currently the leading solid form of N sources, accounting for about 35 percent of the total solid fertilizer N used in the United States, ahead of ammonium nitrate which accounts for about 32 percent of total solid fertilizer N used. The corresponding values for 1960 are 9.5 percent and 61 percent, respectively, indicating the fast relative growth of urea use versus ammonium nitrate. Reasons for urea's relative growth over ammonium nitrate during this period can be attributed to (1) the higher plant nutrient analysis over ammonium nitrate (46 percent vs. 33.5 percent N, respectively); (2) urea being classified as a nonhazardous material whereas ammonium nitrate, under certain conditions and in admixture with certain proportions of carbonaceous materials, may be an explosive compound; (3) the amount of flexibility in the end uses of urea other than fertilizer use in the off-season, particularly as animal feedstock and in certain chemical processing; and (4) the lower cost for air pollution abatement requirements associated with urea production in contrast with that of ammonium nitrate. However, from a chemical processing point of view, urea has certain characteristics that make it less than totally desirable. For instance, urea is produced from any of a variety of known commercial applications of the basic reaction between ammonia and carbon dioxide at elevated temperature and pressures.

The reaction products from such commercial processes are normally aqueous urea solutions containing between about 70 to about 80 percent by weight urea, which solutions can subsequently be processed to form solid urea particulates, such as granules, in any number of ways. [Kirk-Othmer, 3rd Edition, volume 23, pp. 562, 564–572, (1983)] Urea particles/granules produced therefrom exhibit at least two less than desirable tendencies from an engineering processing standpoint, to wit, caking and relatively high friability. The tendency to cake will, of course, vary depending on the manner in which the urea solution has been processed into urea granules. However, such tendency oftentimes makes it infeasible for the resulting urea product to be stored and transported in bulk without added processing considerations being required else the initially prepared, free flowing product may change to a dense, solid, essentially singular mass in the storage vessel or pile. The second negative characteristic of urea granular products produced by the basic reaction supra, is their tendency to break easily into smaller particles and thereby produce substantial amounts of dust while being handled, transported, and applied to the intended soil environment.

Even if the granules hold together during such subsequent storage and transportation and thereby lend themselves to favorable consideration relative to maintenance of satisfactory particle size distribution for the preparation of nonsegregable bulk blends infra, their introduction into modern, rotating turbine-fan type field distribution equipment introduces the added, unwanted consideration of breakage therein and subsequent uneven distribution therefrom. For instance, urea particles which have not been properly treated for exhibiting improved hardness characteristics are oftentimes shattered to an appreciable degree when they are introduced into most common types of equipment, with the result that the small pieces resulting therefrom fall in a shorter trajectory from the distributor and thusly form a more narrow and a more concentrated swath on the soil surface than is originally intended.

The importance, referred to supra, of maintaining of predetermined, closely-sized range of granules will be appreciated when it is realized that there is always the possibility of segregation of granules is such are later incorporated in the production of bulk-blend fertilizer materials. The importance of uniform particle size in the preparation of bulk blends is discussed more thoroughly in TVA reprint Z-49, reprinted from the proceedings of TVA Fertilizer Bulk Blending Conference, Aug. 1–2, 1973, "Quality Control in a Bulk Blending Plant."

In efforst to overcome these major disadvantages, relating to caking and breakage tendencies of particulate/granular urea materials intended for fertilizer applications, the art has turned to two basic approaches. In the first approach, the freshly prepared urea particles are surface treated with any number of a variety of materials, such as clays or diatomaceous earth. This first approach addresses only the problem of improving and anticaking characteristics of the urea material by the addition of additives onto the surface thereof. These additives may, in turn, incorporate foreign elements into or onto the urea which in themselves are, in some instances, not adequately compatible for the purpose for which the urea may ultimately be used. In the second approach to this problem, producers of urea have turned to the incorporation, into either the concentrated urea liquor solution or melt produced therefrom, of additives which impart to the subsequently formed urea particulates either improved anticaking characteristics or improved nonfriable characteristics, i.e., hardness or resistance to breaking or most desirably both. The fertilizer industry has seen increasing demands and concerns, over the past several years, by both commercial fertilizer distributors and by the farmer regarding the mechanical strength of delivered particulate urea. There are several reasons for this consideration relating to hardness or mechanical strength being given such greater emphasis, including the fact that urea is now exposed to substantially greater mechanical strains due to the modern methods of handling and transportation utilized which, in turn, results in more crushing of the urea granules and the undesirable production of greater amounts of dust. Apart from increasing requirements for a nondusting product during the handling thereof, including field distribution, from a purely health and safety consideration, modern day economics dictate that the product material must no be crushable and therefore dust-forming, either during the stage of the handling of same, during the bulk blending thereof, or during the ultimate application thereof to the soil environment.

Because of numerous advances in technology ever occurring in the fertilizer industry it has been necessary to keep abreast of the ever changing methods of production of and use of fertilizer products. For instance, in recent years, one innovation has been the use of fertilizers in fluid form, either as clear solid-free liquids or as suspensions containing undissolved fertilizer particles suspended on a lattice-work of dispersed, gelled suspending agents, e.g., gelling clays. Fluid fertilizer systems, while possessing both advantages and disadvantages in contrast with prill or granular fertilizers, presently enjoy about 20 percent of the fertilizer market. More recently, emphasis in the industry has been placed on using urea as a nitrogen source for the production of various liquid fertilizers, and in particular, for the production of suspensions. In present day practice of suspension fertilizer production, a gelling clay or other gelling or suspending agent is introduced at some point in the mixing procedure to impart suspending properties to the resulting product. Herein lies the gist of my "third" approach supra, which consists of a new and novel concept of incorporating within the urea prill or granule a multipurpose additive that can, not only serve as a prill or granule strengthening agent, but whereby said additive will also have a secondary use of particular significance, to wit, as a suspending agent to be used, if desired, in the production of suspension fertilizers where the so treated urea is used in the suspension formulation as a nitrogen source.

BACKGROUND OF THE INVENTION

1. Field of the Invention

The present invention relates to the production of a vastly improved particulate urea product, normally in granular or prill form, not only possessing eminently improved anticaking and hardness characteristics but also serving as a carrier for suspending agents used to suspend solids in the subsequent production of suspension fertilizers. The modus operandi of the instant invention follows the second and third embodiments discussed supra, to wit, directly or indirectly incorporating into the urea melt certain new, novel, and heretofore unknown additive materials. To be concise, the term unknown is used herein in the sense that said materials, although commonly available, have heretofore been unrecognized as either possessing (1) the desirable characteristics of imparting to the formed urea particles the improved physical characteristics, or (2) the viability of being utilized as built-in suspending agents when said urea particulates are subsequently used in producing fertilizer suspensions.

2. Description of the Prior Art

As mentioned supra, several investigators have discovered, taught, and disclosed a plethora of conditioing agents which may be added either directly to the anhydrous molten urea melt or indirectly thereto by means of incorporating same into the synthesis liquor before said melt is processed to the particulates formed therefrom to improve their anticaking characteristics of their nonfriable characteristics or in some instances both. These problems, as well as other attendent considerations for storage, handling, and application characteristics of granular/particulate urea, have heretofore been alleviated, to a significant degree, by the addition to the urea melt of low concentrations, e.g., 0.1 percent to 1.0 percent, by weight, of formaldehyde or compounds from the generic system of lignin chemicals known as lignosulfonates, which lignosulfonates are commonly produced as metal or ammonium salts of lignosulfonic acid, a by-product of the sulfite pulp paper process. Of particular interest from the practical aspects of this approach for methods employing the addition of formaldehyde and lignosulfonates, are those taught in the following patents:

| U.S. Pat. No. | Author | Issue Date |
|---|---|---|
| 3,112,343 | Allgeuer et al | November 26, 1963 |
| 4,160,782 | Van Hijfte et al | July 10, 1979 |
| 4,204,053 | Elstrom et al | May 20, 1980 |
| 4,587,358 | Blouin | May 6, 1986 |

Perusal of the above references, except for Blouin '358, reveals teachings of the formation of various concentrated solutions of a urea-formaldehyde reaction product(s) which are subsequently added in predetermined and desired amounts to the urea synthesis liquor, either before or after concentration thereof, or to the essentially anhydrous molten melt prior to ultimate formation of the desired particulate urea.

Although many of the problems associated with friability and caking of such formed particulate urea may be alleviated, as indicated above, to a significant degree by the addition of such relatively low concentrations of principally formaldehyde to either the urea synthesis liquor or the essentially anhydrous molten urea melt, modern day health and safety considerations under the genesis of environmental concerns have led to, or are presently leading to the close scrutiny of the many chemicals, organic as well as inorganic, utilized in the fertilizer-food chain. It is my understanding that formaldehyde may now be considered as a possible toxic and/or carcinogenic material by the U.S. Environmental Protection Agency (EPA). If so, such a designation could well lead to either the restriction or total prohibition of the use of formaldehyde in agriculture products, including perhaps its use as a conditioning agent in the preparation of urea for fertilizer or animal feed preparation purposes.

More recently, Blouin, '358 supra, assigned to the assignee of the present invention, has taught the use of, in combination with urea, calcium lignosulfonate (or other metal or ammonium lignosulfonates), homogeneously incorporated therewith and therein, as a vastly improved conditioning material for imparting to the resulting urea both superior anticaking and nonfriable chacteristics. Although this advance in the art by Blouin overcomes many of the disadvantages heretofore normally associated with the use of formaldehyde and derivatives thereof, it in itself may be fraught with cetain minor disadvantages, including the potential marketing acceptance problem that may ultimately prove to be associated with the distinctive brownish discoloration characteristic to materials produced by following his teachings. Aside from the problem of acceptance of brown urea by the farmer, urea utilized by the plastics industry in most instances, must be white in color, or substantially white, i.e., offwhite or cream as when the urea of the instant invention contains more than about 1.5 percent clay. Nevertheless, the teachings of Blouin appear, at this time, to represent a viable and highly desirable alternative to the state of the art upon which it improves. In addition, many of the procedures of producing and/or testing the materials of the instant invention closely parallel his teachings. Accordingly, for purposes of teaching, disclosing, and claiming the instant invention, the teachings and disclosure of Blouin, '358 supra, are herewith and hereby incorporated herein by means of this reference thereto.

It is verily believed that to those skilled in this art, who study the disclosure of the present invention, it will be appreciated that the practice of same overcomes a great multiplicity of the limitations and disadvantages of the various methods and/or means of the type presently found in the prior art and that the present invention results in a new, novel, and unique combination of certain selected features of the advances in the art set forth supra, albeit, with wholly unexpected results.

SUMMARY OF THE INVENTION

The instant invention relates to a vastly improved urea particulate product eminently useful for either direct application to the soil or as an intermediate product for the subsequent incorporation with other fertilizer materials into either solid bulk blends or, most significantly, fluid suspensions. The product of the instant invention has imparted thereto vastly improved anticaking and nonfriable characteristics which render it far superior to urea fertilizer granules produced by the prior incorporation into either the urea synthesis liquor or the essentially anhydrous molten urea melt of either the material, lignosulfonate or formaldehyde, said formaldehyde, in turn added thereto either along or in combination with certain organic modifiers. In addition to the superior characteristics relating to anticaking and nonfriability imparted by the practice of the instant invention, the urea particulate produced thereby also have a further unique and novel characteristic of "instant" gelation when such urea particulates are subsequently admixed with fertilizer solutions, or water and solid fertilizer materials of selected formulations, in preparing suspension fertilizers. The gist underlying the concept of the instant invention is the discovery that certain clays, preferably those of the group comprising channelized 2:1 clay minerals i.e., attapulgite and sepiolite, may be completely substituted for materials such as formaldehyde or lignosulfonate. Not only does the substitution of these clays for such materials as formaldehyde or lignosulfonate reduce the cost of the product and completely eliminate any health and safety considerations in that they are presently approved for use or additives in products for human consumption as well as in animal feed products, but said substitution also allows those involved as users of the urea particulates produced by the practice of the instant invention the following viable alternative considerations (1) use in direct application to the soil; (2) use in blending of the urea particulates with other solids in formulating and producing various grades of solid fertilizer; and (3) use of such urea particulates as a source for both nitrogen and suspending agent (clay additive) in producing varied suspension grade fertilizers by admixing such urea particulates with water or with fluid fertilizer mixtures, and other solid fertilizer components in producing higher grade multigrade suspensions. As will be seen infra, although the amounts of gelling clay incorporated into the synthesis liquor and/or melt for the purpose of increasing the anticaking, hardness, and nonfriable characteristics, ranges preferably about 0.1 to 1.0 percent by weight of the product urea and thereby on the high range requires as much material per ton of product as does the practice employing the use of formaldehyde or lignosulfonate, the sources of gelling clays occurring naturally and mined extensively in the U.S. and other countries make them relatively inexpensive additives whereby the cost of the ultimate product is substantially reduced in that the total cost of my new and novel additive required to obtain anticaking and nonfriable characteristics on the level obtained in those prior art processes incorporating formaldehyde or lignosulfonate, is reduced to about one-twenty-seventh that of formaldehyde, about one-ninth that of calcium lignosulfonate, as a 58 percent solution, and about one-twenty-second that of calcium lignosulfonate as a dry powder.

Additions of the gelling clay at only one-fifth the level that formaldehyde or lignosulfonate are added to the urea particulate to produce the optimum effect results in crushing strengths of the clay-bearing urea being about two- and one-half times that of urea containing formaldehyde or lignosulfonate. Since the hardness or crushing strength is greatly enhanced by the clay additive of the instant invention, the product will not only posses a greatly improved anticaking characteristic but will have higher fracture and abrasion resistance and consequently greatly improved nonfriable qualities.

OBJECTS OF THE INVENTION

It is therefore the principal object of the present invention to develop a new method and/or means for producing particulate urea such as granules or prills wherein the antifracture, anticaking, and nonfriable characteristics thereof are substantially greater than that realized when urea prills and granules are produced by the incorporation into the urea synthesis liquor, or anhydrous molten melt, materials such as formaldeyde or lignosulfonate.

Another principal object of the instant invention is to develop a new method and/or means for producing particulate urea wherein the anticaking, antifracture, and nonfriable characteristics (hardness) thereof are greater than that realized when urea prills and granules are produced by the incorporation into the urea synthesis liquor, or anhydrous molten melt, materials such as formaldehyde or lignosulfonates, and wherein the utilization of such formaldehyde and lignosulfonate are substantially eliminated therefrom and additive materials are substituted therefore which will be more economical than said formaldehyde or lignosulfonate.

A further object of the present invention is to develop a new method and/or means for producing particulate urea such as granules or prills wherein the anticaking and nonfriable characteristics thereof are greater than that realized when urea prills and granules are produced by the incorporation in the urea synthesis liquor, and anhydrous molten melt, materials such as formaldehyde or lignosulfonate, wherein the utilization of such formaldehyde or lignosulfonate is substantially eliminated therefrom and additive materials are substituted therefore which are several times more cost effective than said formaldehyde and lignosulfonate, and wherein said new additive material alleviates any undesirable concerns from the standpoint of environmental aspects, including those aspects relating to toxicity and carcinogenicity.

A still further object of the present invention and one of most substantial significance is to develop a new method and/or means for producing urea particulates which can be used to produce "instant" suspensions by utilizing the urea particulates, e.g., prills and granules which have been modified by adding gelling clays to the urea synthesis liquor or anhydrous melt prior to prilling or granulating or other methods of forming particulates, wherein the utilization of such gelling clays is not only far more cost effective and far superior in promoting hardness and nonfriable characteristics, but wherein such added gelling clays is available to be utilized, if desired, in producing "instant" fertilizer suspensions having the required and desired gel strengths afforded by the shearing, dispersing and/or gelling of such clay additive by mechanical shearing equipment that is normally used by producers/manufactures of suspensions.

Still a further object of the instant invention is to develop a new method and/or means for producing particulate urea wherein superior anticaking and nonfriable characteristics thereof are attainable through the use of optimum quantities of the gelling clay and whereby the urea particulate product is used in formulating suspension fertilizers, said added gelling clay of the instant invention being a readily available suspending agent which, when sheared by state of the art mechanical shearing devices will result in suspension gel strength levels that are commensurate with the gelling clay concentration and corresponding typical gel strengths obtained when such clay is otherwise added as a separate component or in fluid form as is the normal present-day practice in the production of suspension fertilizers.

Still further and more general objects and advantages of the present invention will appear from the more detailed description set forth below, it being understood, however, that this more detailed description is given by way of illustration and explanation only, and not necessarily by way of limitation since various changes therein may be made by those skilled in the art without departing substantially from the true spirit and scope of the present invention.

DESCRIPTION OF THE PREFERRED EMBODIMENTS

It is well known that modern day environmental concerns have led to the close scrutiny of many chemicals used in the fertilizer-food chain, and that formaldehyde is now designated as a toxic and carcinogenic chemical by the EPA. This may well lead to restricted use of formaldehyde in the preparation of certain agriculature products.

Lignosulfonates which are commonly produced as metal or ammonium salts of lignosulfonic acid, a by-product of the sulfite pulp-paper process, while approved as an additive for inclusion in animal feed products as well as food packaging materials, apparently have not, at this time, been approved as an additive for human consumption.

These disadvantages and deficiencies heretofore normally associated and attendant with the practice of the prior art, as it relates to the "second" approach supra, will now be obviated by incorporating into the urea synthesis liquor, either from the synthesis section or the concentration (evaporation) section or into the particulate-forming section, i.e., the molten urea melt, during the manufacturing process, clays, more specicially, gelling clays of the groups comprising channelized 2:1 clay minerals including, for instance attapulgite and sepiolite as well as other clays whose crystalline geometry, i.e., lattice and size are such that they reinforce the urea to strengthen it in much the same was as reinforcement rods and wire strengthen concrete and/or are possessed with the characteristic of effectively altering the crystalline habit or structure of the particulate forms in such a way, i.e, the clay needles of about one micron length offer a plethora of nucleating sites or growth sites, so as to very substantially increase anticaking and nonfriable properties. Since only small quantitites of these materials are necessary to impart the desired physical properties—hardness and storage stability (nonagglomeration in long term storage)—the initial high nitrogen content thereof is maintained and an additional useful and heretofore unappreciated purpose to which the so treated urea may be put, i.e., the use in producing suspension fertilizers by utilizing the gelling clay additive as a suspending agent, is for the first time realized. The clay additives supra, being inert in the reactive sense, are considered to be completely nontoxic and safe to use, e.g., one of their many current commercial uses is as an additive for inclusion into food products intended for both human and animal consumption.

In carrying out the practice of the present invention as outlined above, use is made of dry channelized 2:1 clay minerals, particularly attapulgite (palygorskite), which is a low cost, in amounts of at most 4 percent of the weight of the urea when used as a nitrogen source additive for producing suspension fertilizers, and preferably from only about 0.1 pecent to about 1.0 percent by weight of the product urea when used for improving both anticaking and nonfriable characteristics, it being understood by those skilled in this art that the clay, of whatever concentration, is available to impart suspension gelling characteristics to the degree afforded by the clay level used.

The clay additives are, as previously stated, mined products which have undergone minimal processing, e.g., extrusion and drying at the vendor's plant, and are of very low cost when compared to processes of parallel objectives that utilize formaldehyde or lignosulfonates as the conditioning agents for urea, as taught in the prior art. In preparing the final product, according to the teachings of the instant invention, an anhydrous urea melt, or urea melt containing a relatively low percentage of water, is easily intimately mixed with the clay additive in the necessary ratio. The resulting mixture can then be transformed into particulate forms of urea, e.g., prills, granules, and/or pellets by any number of the many methods presently known and practiced in such art. For purposes of comparing data of the instant invention with that of Blouin, '358 supra, the urea-clay mixtures were molded into hemispherical segmented pellets of the size evaluated in his teachings. Since the clays are not soluble in the urea melt, mild agitation was required to maintain homogeneous distribution of the clay additive in each hemispherical segment of urea subsequently formed after the mixing step.

EXAMPLES

In order that those skilled in the art may better understand how the present invention can be practiced, the following examples are given by way of illustration and not necessarily by way of limitation. Although the data taught, disclosed, and discussed in the following two examples reflects on specific use of the material attapulgite clay, the instant invention is, of course, not necessarily limited thereto in that a number of other clays are considered herein. It is suggested that the emphasis herein on the use of such attapulgite clay is quite appropriate in that it is perhaps the gelling clay type most commonly used in the suspension fertilizer industry and normally most economically attractive.

EXAMPLE I

In the pursuit of further information for the purpose of more clearly defining the parameters affecting the practice of the instant invention, the investigations herein were made to determine if indeed, that for a given amount of clay additive, the desirable objectives of the instant invention will consistently be attained and realized. Accordingly, in the tests comprising this example, 200-gram batches of molten urea at 285° F. were treated by adding small amounts of attapulgite gelling clay, as indicated in the tabulation below, with thorough mixing thereof for about 2 minutes. The mixture was then poured, as in the laboratory scale testing procedure of Blouin, '358 supra, into procelain color plates wherein it quickly solidified into hemispherical-like segments about 0.3 inches thick and about 0.8 inches wide. After cooling and aging for a period of some 4 hours, the hemispherical segmented pellets were tested for hardness by compressing them in a compression tester to their breaking points. Untreated urea pellets were similarly produced and tested as control samples. The results of these tests, and for purposes of ease of comparison, the results of Blouin supra, are given in Table I below.

TABLE 1

| Additive | None | Formal-dehyde | Calcium lignosulfonate as Powder | Calcium lignosulfonate as 58% Soln. | Attapulgite Clay | | | | | |
|---|---|---|---|---|---|---|---|---|---|---|
| Weight % additive in urea | 0 | 0.50 | 0.75 | 0.75 | 0.10 | 0.25 | 0.75 | 1.5 | 2.0 | 4.0 |
| Crushing strength in lb | 18.3 | 48.06 | 24.47 | 48.28 | 125.10 | 143.7 | 145.2 | 157.0 | 165.36 | 185.6 |
| Increased strength over untreated urea, % | — | 163 | 34 | 165 | 584 | 685 | 693 | 758 | 804 | 914 |
| Increased strength over urea, with formaldehyde % | — | — | 49* | 1 | 160 | 199 | 202 | 227 | 244 | 286 |
| Increased strength over urea, with Calcium ligno-sulfonate % | — | — | 49* | — | 159 | 198 | 201 | 225 | 242 | 284 |
| Cost of additive in dollars per ton of urea | — | 2.66 | 2.25 | 0.90 | 0.10 | 0.25 | 0.75 | 1.5 | 2.0 | 4.0 |

*Actually, the strength decreased as compared with the material containing formaldehyde or lignosulfonate.

From a reading of the above data it should be apparent to all skilled in this art, that the clay additive yielded a crushing strength (hardness) that was much greater than that attained with untreated urea, formaldehyde-treated urea, and lignosulfonate-treated urea. The cost of the clay portion of treated urea is much lower than that for the other additives. The clay at a concentration of 0.25 percent yielded a hardness of about 685, 199, and 198 percent more than that of untreated urea, the formaldehyde-treated urea, and the lignosulfonate-treated urea, respectively. The hardness of urea particulates directly reflects the ability of the urea to withstand both caking in storage as well as friability and fracture during handling and storage.

EXAMPLE II

For the purposes of the investigations reflected by this example and performed in the pursuit of further definition of the parameters referred to in Example I supra, this portion of our investigation was based on the proposition that perhaps the practice of the instant invention may indeed be a viable factor of some significance in the practice of our alternate embodiment thereof as it relates to utility in the preparation of suspensions. The tests comprising Example I supra, were intended to show the distinct advantages realized by incorporating clay as a strengthening agent over and above those obtained by the practice of prior art processes that utilize the additives formaldehyde and lignosulfonate. The tests comprising the instant example are herein set forth for the purpose of illustrating the "instant" suspending power of the clay additive present in the urea particulate as it relates to the "third" approach, supra. As in Example I supra, 200-gram batches of molten urea at 285° F. were treated by adding varied levels of attapulgite gelling clay, as indicated in the tabulation below, with thorough mixing thereof for about 2 minutes. The admixture was then poured into procelain color plates wherein it quickly solidifed into hemispherical-like segments about 0.30 inches thick and about 0.80 inches wide. After cooling and aging for a period of some 4 hours, the segmented pellets were crushed with the use of a mortar/pestle and screened to <10 mesh (Tyler) size particulates. The particulates were then used to prepare suspension fluids wherein such particulates were added in 50:50 proportions with water or an ammonium-polyphosphate liquid fertilizer of 10-34-0 (10 percent nitrogen, 34 percent phosphate as $P_2O_5$) grade and mixed by shearing in a Waring blender for about 5 minutes with the blade of the blender operating at a tip-speed (speed of the rotating blades as measured at the farthest point from the shaft, i.e., at the tip of the blade) of approximately 35 feet per second. NOTE: Any references made herein to materials and-/or apparatus which are identified by means of trademarks, tradenames, etc., are included soley for the convenience of the reader and are not intended as or to be construed an endorsement of said materials and/or apparatus. This is a mixing condition that is normally considered to be moderate agitation and is an operating condition which is readily attainable in present day commercial facilities wherein suspension fertilizers are produced with the use of mechanical shearing devices to disperse and gel suspending clays. The results of these tests with dry attapulgite clay along with control tests wherein the attapulgite clay was added to the mixtures of urea prills and water or 10-34-0 liquid as a separate entity, are illustrated in Table II infra. By way of evaluation the resulting products were measured for viscosity in units of centipoises with a commonly used standard single point viscosity measuring instrument, the type of which is generally found in laboratories in which fluid rheology is investigated. Gel strength, the suspension characteristic that reliably portrays or predicts a suspension's ability to suspend solid particulates, e.g., secondary nutrients, micronutrients, herbicides, etc. was measured with an instrument called a "gelometer" which determines gel strength by the direct measurement of the torque needed to restrain rotation of a bob immersed in a gel suspended by a wire with a known torsion constant. [J. G. Getsinger, F. P. Achorn, and George Hoffmeister "Fluid Fertilizers," TVA Bulletin Y-185, pp 86–87, (1984)].

The suspension products made by the practice of the instant invention were at least the same quality or, in some instances much better than suspension products produced by processes of the prior art whereby the suspending clay is added as a separate entity. As is evident from the above discussions, the essence of the present invention is couched in the substitution of a far more effective, nontoxic earthy clay, such as dry attapulgite gelling clay, for either the potentially toxic additive formaldehyde, the current major commerical urea particulate conditioning agent, or a lignosulfonate, into the urea being processed and doing so at a cost per ton of urea much lower than that for formaldehyde or calcium lignosulfonate and with the added benefit of the clay also serving as a built-in suspending agent for latter use in preparing fertilizer suspensions. In practice, about 1.25 percent of a typical attapulgite clay at a cost of about 25 cents per ton of urea product should be most satisfactory as an enhancer of anticaking (hardness) and nonfriable properties of urea particulates. While this level of clay may be considered low as the clay level required for suspending purposes supra, especially after diluting to even lower levels by admixing the fluid systems and other solids, the clay is still available for some degree of suspending. At a level of about 3.0 percent clay in the urea particulate, I have found that it can function as the sole source of clay for gelling, depending upon the subsequent dilution and the required suspending characteristics, i.e., 1.5 percent clay concentration in a finished suspension is normally sufficient.

TABLE II

Tests to Illustrate Production of "Instant" Suspensions Through Use of Clay-Bearing Urea Particulates

| | | | | |
|---|---|---|---|---|
| Clay Additive, weight % | 1.00 | 2.00 | 4.00 | 6.00 |
| Cost of Additive, $/ton of Urea | 1.00 | 2.00 | 4.00 | 6.00 |
| Analyses, wt. % | | | | |
| Total N | 45.9 | 45.3 | 44.4 | 42.9 |
| Biuret | 0.8 | 0.6 | 0.8 | 1.0 |
| H₂O (Karl-Fisher) | 0.1 | 0.2 | 0.4 | 0.6 |
| Gelling Properties | | | | |
| 50/50 rea:H₂O | | | | |
| 23-0-0 grade | | | | |
| Viscosity, cp[1] | 75 | 130 | 260 | 855 |
| Gel strength, g-cm[1] | 0.7 | 2.2 | 11.6 | 59.2 |
| Viscosity, cp[2] | 12 | 26 | 35 | 40 |
| Gel strength, g-cm[2] | 0.0 | 0.0 | 1.5 | 1.5 |
| 50/50 Urea:10-34-0, 28-17-0 grade | | | | |
| Viscosity, cp[1] | 640 | 840 | 995 | 1940 |
| Gel strength, g-cm[1] | 4.5 | 10.8 | 23.8 | 89.9 |
| Viscosity, cp[2] | 680 | 760 | 1280 | 2000 |
| Gel strength, g-cm[2] | 2.2 | 3.7 | 15.6 | 48.2 |

[1]Clay incorporated in the urea re instant invention.
[2]Control samples wherein the clay was added separately as in normal suspension preparation procedure.

INVENTION PARAMETERS

After sifting and winnowing through the data supra, as well as other results and operations of my new, novel, and improved method for effecting the production of particulate urea, including granular urea displaying eminently improved anticaking and nonfriable characteristics and having, as a dual role thereof, utilization in the production of fertilizer suspensions, I now present the operating variables and preferred conditions for carrying out my process as are summarized below.

| Variables | Operating Limits | Preferred Limits | Most Preferred Limits |
|---|---|---|---|
| Wt. % Urea - Melt | 95–100 | 99–100 | 99.7 |
| Temp. (°F.) - Urea Melt | 260–330 | 280–310 | 285–295 |
| Wt. % Clay Solids, Concentration in urea particles for hardness and nonfriable characteristics | 0.05–5.0 | 0.05–1.0 | 0.1–0.5 |
| Wt. % Clay Solids Concentration in urea particles for suspending purposes | 0.5–10.0 | 1.0–6.0 | 1.5–4.0 |
| Retention time in urea melt prior to solidification process (min) | 1.0–40 | 1.0–3.0 | 1.0 |

While I have shown and described particular embodiments of my invention, modifications and variatios thereof will occur to those skilled in the art. I wish it to be understood therefore that the appended claims are intended to cover such modifications and variations which are within the true scope and spirit of my invention.

What I claim as new and desire to secure by Letters Patent of the United States is:

1. An improvd product resulting from the production of hard, free-flowing, storage-stable particulate urea, each particle thereof being substantially homogeneous, being substantially white in color, and consisting essentially of an admixture of urea and a gelling-type channelized 2:1 clay mineral, the quantity of said clay mineral ranging from about 0.05 percent to about 5.0 percent by weight of said admixture.

2. The improved hard, free-flowing, storage-stable particulate urea product of claim 1 wherein said clay mineral ranges from about 0.05 percent to about 1.0 percent by weight of said admixture.

3. The improved hard, free-flowing, storage-stable particulate urea product of claim 2 wherein said clay mineral ranges from about 0.25 percent to about 0.5 percent by weight of said admixture.

4. An improved method of imparting to particulate urea the properties of substantially increased resistance to breaking under impact, of nonagglomeration during prolonged storage, and of reduced dusting during melt granulation processing to form said particulates, which improved method comprises the steps of:

(a) mixing a gelling-type channelized 2:1 clay mineral into an essentially anhydrous molten melt of urea or highly concentrated urea synthesis solution subsequently utilized to produce said melt until a homogeneous mixture thereof results; and (b) subsequently converting said melt into particulate form; said improved method characterized by the fact that the resulting individual particulates contain from about 0.05 to 5.0 percent by weight of said clay mineral and said improved method further characterized by the fact that substantially no discoloration of said urea is affected thereby.

5. The improved method of claim 4 wherein the amount of clay admixed with said anhydrous molten urea molten or into said synthesis solution, utilized for the production thereof, is utilized in amounts to range from 0.05 percent to about 1.0 percent by weight of said clay in the urea product.

6. The improved method of claim 5 wherein the amount of clay admixed with said anhydrous molten urea melt or into said synthesis solution, utilized for the production thereof, is utilized in amounts to range from 0.25 percent to abou 0.5 percent by weight of said clay in the urea product.

7. An improved product resulting from the production of hard, free-flowing, storage-stable particulate urea for subsequent use as a nitrogen and suspending agent source for the production of suspension fertilizers, each particle thereof being substantially homogeneous, being substantially white in color, and consisting essentially of an admixture of urea and a gelling-type channelized 2:1 clay mineral, said clay mineral selected from the group consisting of attapulgite, sepiolite, and mixtures thereof, and the quantity of said clay mineral ranging from about 0.5 percent to about 10.0 percent by weight of said admixture.

8. The improved hard, free-flowing, storage-stable particulate urea product of claim 7 wherein said clay mineral ranges from about 1.0 percent to about 6.0 percent by weight of said admixture.

9. The improved hard, free-flowing, storage-stable particulate urea product of claim 8 wherein said clay mineral ranges from about 1.50 percent to 4.0 percent by weight of said admixture.

10. An improved method of incorporating in particulate urea an additive, which additive both enhances the anticaking and nonfriable characteristics thereof and effects, as a suspending agent, the production of suspension fertilizers, which improved method comprises the steps of:

(a) mixing gelling-type channelized 2:1 clay mineral into an essentially anhydrous molten melt of urea or highly-concentrated urea synthesis solutions subsequently utilized to produce said melt until a homogeneous mixture thereof results; and (b) subsequently converting said melt into particulate form; said improved method characterized by the fact that the resulting individual urea particulates contain from about 0.5 percent to 10.0 percent by weight of said clay mineral and said improved method further characterized by the fact that substantially no discoloration of said urea is affected thereby.

11. The improved method of claim 10 wherein the amount of said clay mineral admixed with said anhydrous molten urea melt or into said synthesis solution utilized for the production thereof is utilized in amounts to range from 1.0 percent to 6.0 percent by weight of said clay mineral in the urea product.

12. The improved method of claim 11 wherein the amount of said clay mineral admixed with said anhydrous molten urea melt or into said synthesis solution utilized for the production thereof is utilized in amounts to range from 1.50 percent to 4.0 percent by weight of said clay mineral in the urea product.

13. The improved method of claim 4 wherein said clay mineral is attapulgite.

14. The improved method of claim 5 wherein said clay mineral is attapulgite.

15. The improved method of claim 6 wherein said clay mineral is attapulgite.

16. The improved method of claim 10 wherein said clay mineral is attapulgite.

17. The improved method of claim 11 wherein said clay mineral is attapulgite.

18. The improved method of claim 12 wherein said clay mineral is attapulgite.

* * * * *